Patented Sept. 5, 1950

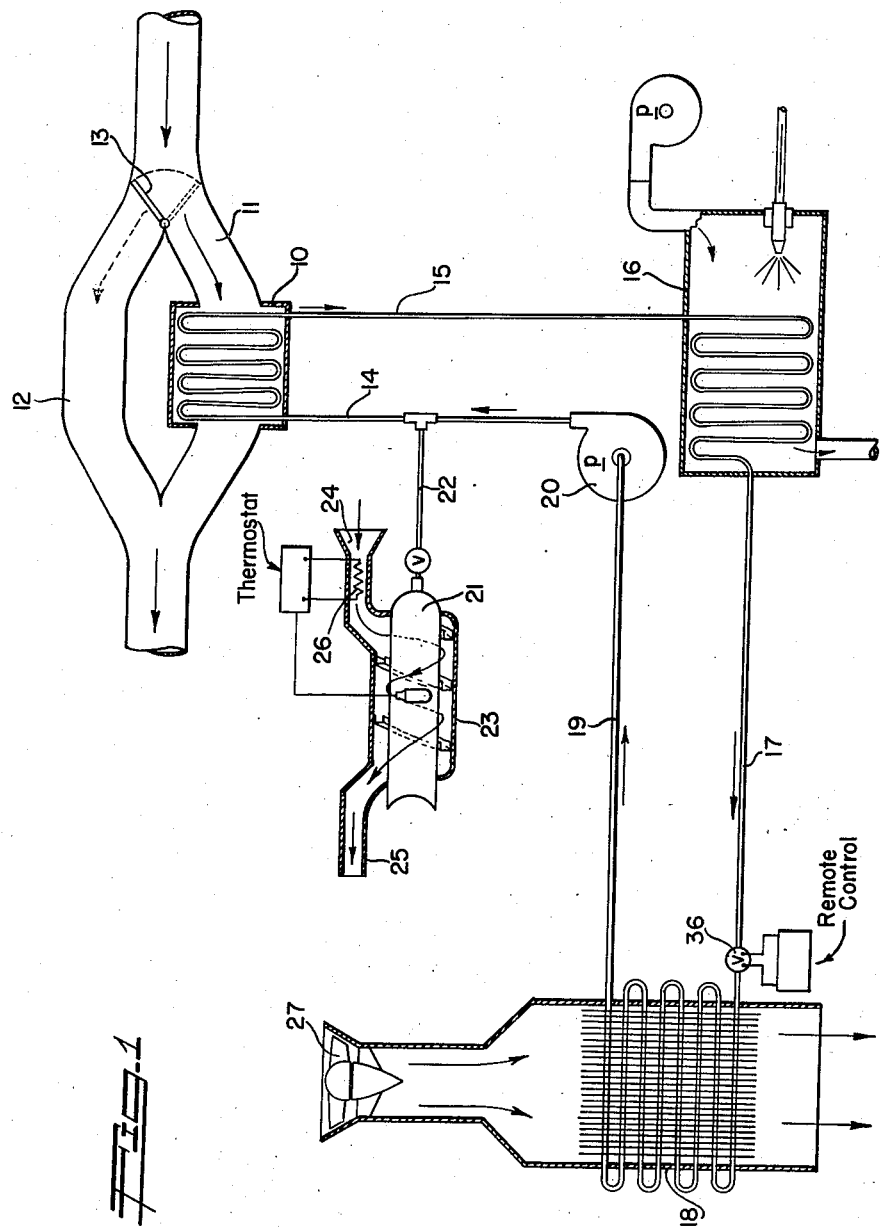

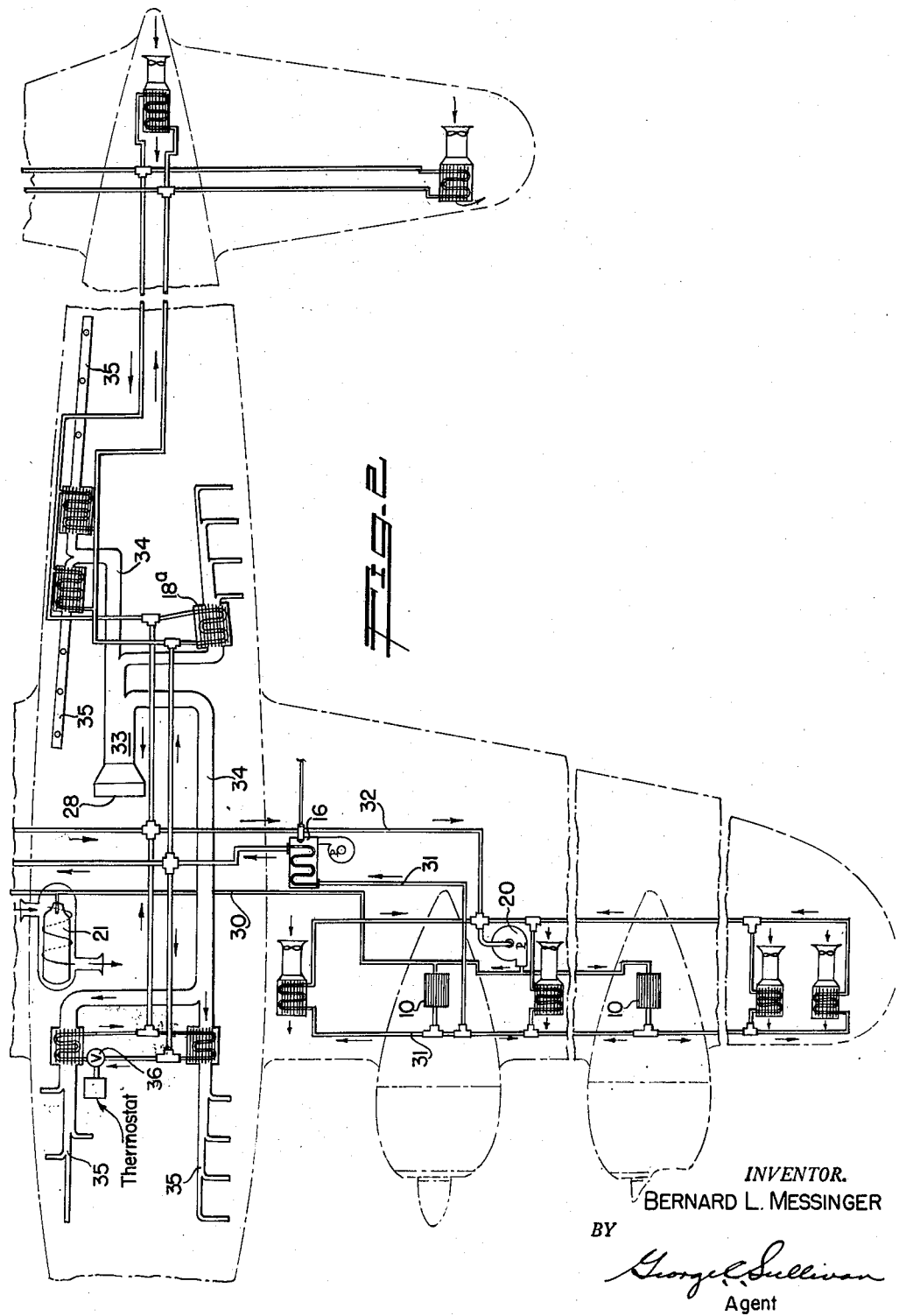

2,521,393

UNITED STATES PATENT OFFICE 2,521,393

AIRCRAFT HEATING SYSTEM

Bernard L. Messinger, Los Angeles, Calif., assignor to Lockheed Aircraft Corporation, Burbank, Calif.

Application August 13, 1946, Serial No. 690,301

3 Claims. (Cl. 237—2)

This invention relates to heating and de-icing arrangements for aircraft, and has special reference to the use of high pressure and high temperature carbon dioxide gas as the convective fluid or heat transfer medium between exhaust gas heat exchangers, and remotely positioned output heat exchangers delivering heat to a secondary fluid such as the air within the airplane cabin, wings, and empennage.

A comprehensive aircraft heating system should provide for cabin heating during all conditions of flight, as well as "standby" operations on the ground with the airplane power plants shut down. Wing and empennage anti-icing is another heating requirement primarily necessary in flight, but also desirable for standby to permit removal of frost, sleet, and snow accumulated while the airplane is parked. Galley heating requirements also become significant in long range aircraft. With the heating equipment functioning on a standby basis, it is also available for preheating the power plant nacelles for cold weather starting.

Various heating systems have been proposed in the past, such as exhaust heated low pressure air delivered direct to the cabin, exhaust heated steam or glycol circulation secondary heat exchangers, electric, and separate combustion heaters. All have various and serious drawbacks, such as requiring enormous ducts for directly heated low pressure air systems, freezing in steam, and decomposition of glycol in the circulation systems, excessive weight and power consumption in the generating equipment for electrical systems, and unreliability of ignition at altitude, potential fire hazard, and fuel consumption in the combustion heaters.

It is accordingly an important object of this invention to provide an improved aircraft heating system wherein a stable, low viscosity fluid is circulated at high temperatures and pressures between exhaust heated primary heat exchangers and secondary heat exchangers for heating air supplied to the cabin and/or for anti-icing purposes. Such a system has the advantages of light-weight, compactness because of small ducts, plumbing lines and heat exchangers, small power consumption, flexibility of installation and local control of heat output, simple ground operation by means of a standby heater, and temperatures sufficient for anti-icing and galley heating.

It is a further important object of this invention to provide a heating system of the type described wherein the operating pressure of the circulating fluid can be controlled from a make-up or supply source without loading a fluid circulating pump with other than the friction losses inherent in the circulating system of plumbing and heat exchangers.

It is another important object of this invention to provide a heating system of the type described wherein the secondary heat exchangers may be freely located wherever needed and locally controlled to provide zone heating to meet the needs of the various locations.

It is still another object of this invention to provide a heating system of the class described wherein a circulating fluid is used which can be carried in a make-up container as a liquid under pressure, and wherein the pressure in the system can be automatically maintained and fluid replenished by controlling the temperature of the container therefor.

It is also an important object of this invention to provide a heating system of the type described wherein standby service can be provided by a combustion heater included in the circulating path of the heat transfer fluid.

Other objects and features of the invention will be readily understood from the following detailed description of a typical preferred form of the invention wherein reference will be made to the accompanying drawings in which:

Figure 1 is a diagrammatic layout of a simple heating system embodying the features of this invention;

Figure 2 is a diagrammatic layout of the heating system of Figure 1 as applied to a large airplane having a plurality of primary and secondary heat exchangers providing a zone heating system for cabin heating and wing and empennage anti-icing.

As shown on the drawings, the basic system of Figure 1 provides a primary heat exchanger 10 located in an exhaust connection 11 from the main power plant (not shown). A by-pass duct 12 and by-pass valve 13 permit diverting the flow of exhaust gases from the exchanger 10 when no heat is required from the heating system. The heat exchanger has supply 14 and return 15 conduits, the return or heated conduit 15 leading to a standby combustion heater 16 and thence by a conduit 17 to a secondary heat exchanger 18 located wherever desired in the airplane. From the secondary heat exchanger a return conduit 19 leads to a circulating pump 20 which discharges into the first mentioned supply conduit 14. The circulating pump 20 merely has to overcome line losses or friction, a boost of perhaps fifty pounds pressure in the system shown in Figure 2.

The circulating fluid to be used may be either air, carbon dioxide or other stable gases, although I prefer carbon dioxide because of its convenient critical temperature. The use of high pressure air would involve risk of explosions and problems of make-up, and pressure maintenance involving compression ratios of from 75 to 150 at high altitudes if air is drawn from the atmosphere, or large volume reservoirs if precharged to the required pressure, since liquid air could not conveniently be maintained as such to form a source of supply.

When carbon dioxide is used as the circulating fluid, the working pressure in the system can be maintained by providing a bottle 21 of liquid carbon dioxide connected to the supply conduit 14 by a pipe 22. The saturation temperature-pressure relationship for carbon dioxide enables automatic maintenance of system pressure at 800 p. s. i. by maintaining or regulating the temperature of the bottle 21 at 64° Fahrenheit. Other pressure and temperature combinations can, of course, be selected from the known characteristics of carbon dioxide up to its critical temperature of 88° F., involving a critical pressure of approximately 1100 p. s. i. While other gases might be selected, I prefer carbon dioxide because it is commercially available as a liquid in high pressure containers, and is a stable, low viscosity and inert gas with fire extinguishing properties.

The bottle 21 is commercially available and can readily be replaced when the pressure therein drops to system pressure. In order to control the bottle temperatures and hence the system pressure, it is inserted in a jacket 23 having arrangements to circulate air therearound comprising an air inlet horn 24, which may be supplied by cool air from the cabin pressure system, and an air outlet 25. Heating means 26, such as an electric coil with suitable controls, serve to control the temperature of the jacket air at the desired point. In the event the temperature of the available cooling air exceeds the desired temperature, no harm is done, as the critical pressure of carbon dioxide is about 1100 p. s. i.

The secondary heat exchanger 18 may have an individual electric driven fan 27 for circulating therethrough the air to be heated, or reliance may be had on the cabin ventilating system, by providing individual ducts from a central source 28 of fresh or recirculated air, as shown and described in more detail in connection with the prototype heating system shown in Figure 2.

Since the heating system is not necessarily operated at times when heat is not needed, the circulating pump 20 can be shut down, and the exhaust by-pass valve 13 shifted to by-pass the primary heat exchanger, although as carbon dioxide is stable up to about 3000° F., the then stagnant gas in the primary interchanger would not be injured by long exposure to the temperatures involved in the engine exhaust system.

A desirable temperature range would be 800° F. out of the primary heat exchanger 10 and 400° F. in the return lines, as wing and empennage anti-icing requires a minimum temperature in the secondary heat exchangers of approximately 350° F. for adequate heat transfer, and galley cooking and heating requirements are simplified by providing such an operating temperature.

The schematic diagram of a prototype airplane system shown in Figure 2 uses primary or exhaust heated exchangers 10 in connection with each power plant, which exchangers are coupled together in parallel. One wing has been omitted from the figure, but the layout and piping is duplicated therein; a make-up and pressure regulating carbon dioxide bottle 21 being connected by a pipe 30 leading to each primary heat exchanger 10, this pipe corresponding to the supply conduit 14 of Figure 1 and serving as a cross feed line to allow any one primary heat exchanger to be supplied from circulating pumps 20 in either wing. A pipe 31, with numerous branches identified by the same numeral for convenience in tracing, leads heated fluid to the various secondary heat exchangers strategically located relative to the airfoil surfaces to be heated, as well as in individual heating zones in the cabin. A return pipe 32 similarly connects to the various outlets of the secondary exchangers to return the fluid to the circulating pump 20 which may be duplicated in the other wing.

The anti-icing heat exchangers 18 include the fan as shown in Figure 1, as it is preferable to use a closed air circulating path in the wings and empennage to avoid the heat losses involved in heating ambient air to the temperature of the recirculating air in a closed system.

The zone heat exchangers 18a in the occupied portion of the cabin are similar to those previously described, but do not have individual fans as it is convenient to use the normal cabin pressurizing and ventilating arrangements to supply air to a common duct 33 from which branch ducts 34 lead to the several zone heaters, from which further ducts 35 deliver and diffuse the heated air to desired locations.

It will be evident that conventional heating controls for each of the zone secondary heat exchangers can provide tailored temperatures to the order of the occupants, as the pilots' and seating compartments may require different temperatures than would berth compartments. Such conventional heating controls can be either dampers, by-pass mixers as shown in connection with the primary heat exchanger, or throttle valves 36 on the heating fluid supply, subject to conventional remote or thermostatic controls.

In the prototype aircraft heating system diagrammed in Figure 2, the maximum heating load in the wing and empennage secondary heat exchangers on a closed cycle basis, is computed to be 885,000 B. t. u. per hour at an outside temperature of −5° F. The cabin heating load is calculated to be 230,000 B. t. u. at the same temperature, and 353,000 B. t. u. at −65° F. ambient temperature at which time no provision for anti-icing is required because the icing range is above −5° F. Accordingly, the maximum load on the heating system would be approximately 1,115,000 B. t. u. at −5° F., yet the fluid conduits to handle such high heat transfer vary from one-half to one and one-quarter inches in size. The heat loss from these conduits is nominal, as they can be well insulated at a nominal weight penalty. The estimated weight of the entire heating system of Figure 2 is less than 1100 pounds.

It will thus be seen that I have provided an improved and simplified high pressure convective fluid heating system capable of high heat transfer and localized control, wherein the fluid is automatically maintained at the desired operating pressure by controlling the temperature of a source of supply for make-up fluid.

Having described only a typical form of the invention, I do not wish to be limited to the specific details herein set forth, but wish to reserve to myself any variations or modifications that may appear to those skilled in the art and/or fall within the scope of the following claims.

I claim as my invention:

1. A space heating system comprising a closed circulating system charged with carbon dioxide gas, means for heating the gas in said system at at least one point remote from said heating point, means for circulating the carbon dioxide in said closed system, a high pressure bottle of liquid carbon dioxide connected to said closed circuit adapted to supply and absorb carbon dioxide gas as the pressure in said closed circuit varies, and means for maintaining a predetermined temperature in the liquid carbon dioxide in said bottle whereby to predetermine and maintain a pressure in said closed circuit corresponding to the saturation pressure of the gaseous and liquid carbon dioxide at the predetermined temperature of the liquid carbon dioxide.

2. A space heating system comprising a closed piping circuit including supply and return ducts connecting primary and secondary heat exchangers, means for charging said closed circuit with a stable convection gas, means for circulating said gas in said closed circuit, a container partially filled with the liquid phase of said gas in unrestricted communication with said closed circuit whereby to supply and absorb the gas as the pressure in the closed circuit falls and increases respectively, and means for maintaining a predetermined temperature in the liquid in said container whereby to predetermine and maintain a pressure in said closed circuit corresponding to the saturation pressure of the gas and its liquid phase at the predetermined temperature of the liquid.

3. A space heating system comprising a closed circuit including supply and return ducts connecting primary and secondary heat exchangers, a container of liquid carbon dioxide in unrestricted communication with said closed circuit and adapted to charge said closed circuit with gaseous carbon dioxide at the pressure of the liquid carbon dioxide in said container, and means for maintaining a pressure in said closed circuit corresponding to the saturation pressure of gaseous carbon dioxide in the presence of liquid carbon dioxide at a predetermined temperature of the liquid carbon dioxide, including means adapted to maintain such predetermined temperature in the liquid carbon dioxide in said container.

BERNARD L. MESSINGER.

REFERENCES CITED

The following references are of record in the file of this patent:

UNITED STATES PATENTS

| Number | Name | Date |
| --- | --- | --- |
| 1,579,314 | Harrison | Apr. 6, 1926 |
| 1,844,268 | Alex | Feb. 9, 1932 |
| 1,934,958 | White | Nov. 14, 1933 |
| 2,264,297 | Clay | Dec. 2, 1941 |